(No Model.) 2 Sheets—Sheet 1.
J. H. BARLEY.
HARROW.
No. 364,331. Patented June 7, 1887.
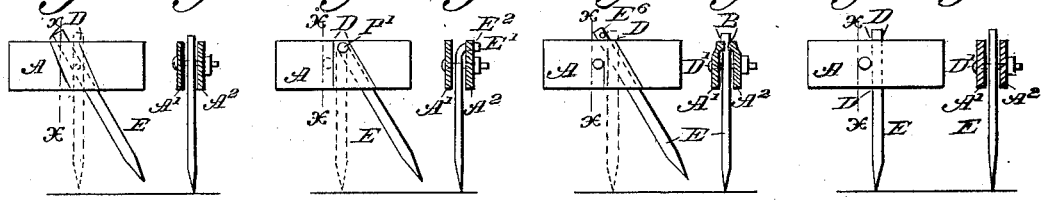
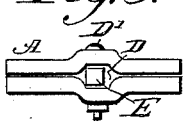 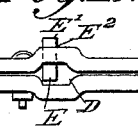 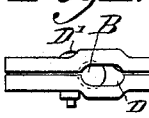 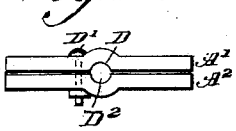
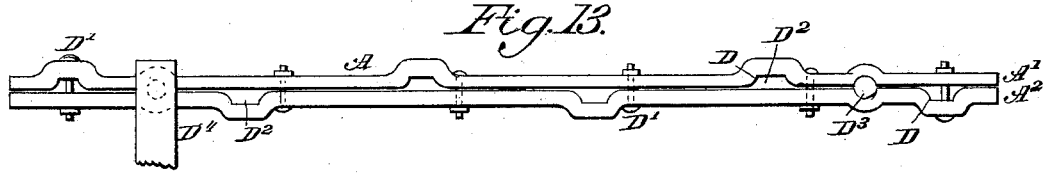
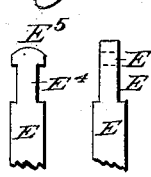 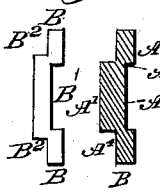 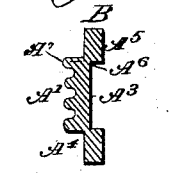 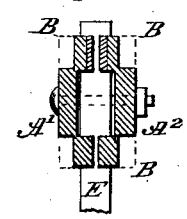
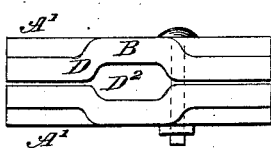 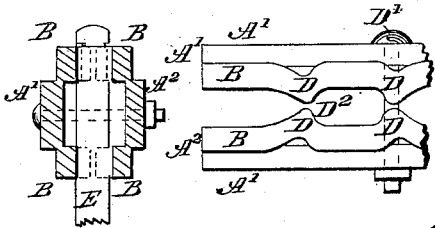 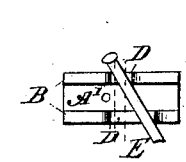
Witnesses:
N. E. Mortmans
Geo. E. Ross
Inventor:
James H Barley (No Model.) 2 Sheets—Sheet 2.
J. H. BARLEY.
HARROW.
No. 364,331. Patented June 7, 1887.
Fig. 23. Fig. 24. Fig. 25. Fig. 26.
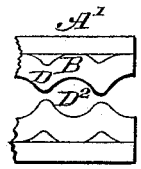 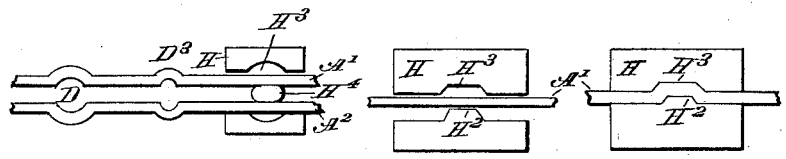
Fig. 27. Fig. 28. Fig. 29.
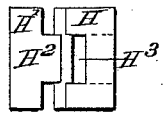 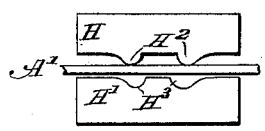 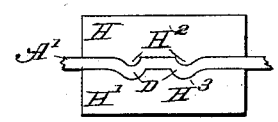
Fig. 30.
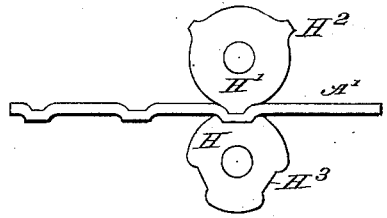
Fig. 31.
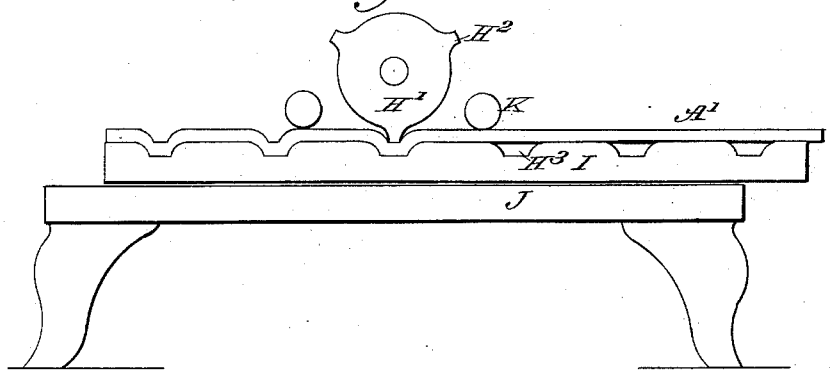
Witnesses: Inventor:
H. C. Morman James H Barley
Geo E Rall
N. PETERS, Photo-Lithographer, Washington, D. C.

UNITED STATES PATENT OFFICE.

JAMES H. BARLEY, OF SEDALIA, MISSOURI.

HARROW.

SPECIFICATION forming part of Letters Patent No. 364,331, dated June 7, 1887.

Application filed May 17, 1886. Serial No. 202,492. (No model.)

*To all whom it may concern:*

Be it known that I, JAMES H. BARLEY, a citizen of the United States of America, residing at the city of Sedalia, in the county of Pettis and State of Missouri, have invented certain new and useful Improvements in Harrows, of which the following is a specification.

My invention relates to certain improvements in the tooth-supporting wrought-metal frame bars or rails of field drag-harrows patented to me under Letters Patent No. 326,704; and it consists in constructing each harrow-tooth rail or beam of two bars or plates of metal placed side to side, having a series of depressions on their inner side surfaces, forming tooth-seat openings extending in a vertical direction through between said bars, in which openings the harrow-teeth are inserted and supported by integral shoulders or stops.

My invention further consists in the peculiar form of constructing metal bars of which the tooth rails or beams may be made.

The object of this invention is to produce a harrow-tooth rail or beam formed with two flat bars of plate metal, or of the special-shaped bars above referred to and hereinafter more fully described. A further advantage gained in the use of this special-shaped bar is, that they are rendered capable of being made of rolled steel or other suitable metal sufficiently light to admit of the integral tooth-supports being formed thereon without first preparing them by heat.

All the above-named advantages I attain by the mechanism as herein described, and illustrated in the accompanying drawings, forming part of this specification, and to the letters and figures of reference marked thereon, as hereinafter more fully described, and pointed out in the claims.

Figure 1 in the drawings is a side elevation of a portion of one of my improved tooth rails or beams, showing a tooth inserted and supported at different angles between the two bars comprising said rail or beam; and Figs. 3, 5, 7, and 22 are similar views of same, showing slight variations in forming the integral tooth-supports and the manner of attaching the teeth in their respective places. Figs. 2, 4, 6, 8, 18, and 20 are views showing the rail or beam and tooth in vertical cross-section, taken through the line $x$ $x$, Figs. 1, 3, 5, and 7. Fig. 9 is a longitudinal edge view of a portion of the rail or beam, showing the means formed on the inner sides of the two bars for supporting the teeth in position; and Figs. 10, 11, 12, 19, 21, and 23 are similar edge views showing slight variations in form of construction. Fig. 13 is a longitudinal edge view of one of the rails or beams formed of two continuous metal bars or plates full length, having the usual number of tooth-seats with integral supports formed alternately in each one of said bars or plates. Fig. 14 is side and edge view of the upper ends of the tooth, showing slight variation in forming the head portion thereof. Figs. 15, 16, and 17 are vertical cross-sectional views of an improved shape metal bar of which the tooth rails or beams may be constructed, showing slight variations in form. Fig. 24 is a plan top view of a portion of the two-part metal tooth rail or beam, showing the dies in position for bending the two side bars or plates forming the depressed tooth-seats and supports on their inner side surfaces. Figs. 25 to 31, inclusive, show a collection of dies in detail adapted to the purpose of forming the tooth-seats and their supports on the rails or beams by rolling, stamping, or pressing.

In the drawings, A represents the harrow-tooth rail or beam of which the sections are formed. A' A² are two continuous metal bars or plates comprising said rail or beam.

E are the teeth, and D are the integral tooth-supports formed on the inner sides of said bars A' A².

D' is a clamping bolt, pin, or rivet passing through the side of the rail or beam, and D² are the tooth-seat openings formed extending through between the bars A' A².

In the construction of my improved tooth rail or beam I do not limit myself to forming the integral tooth-supports D at equal or any specified distances apart longitudinally on the inner side surfaces or edges of said bars A' A², as the special manner of forming said supports may be varied, as shown in detail at drawings, Figs. 1, 3, 5, 7, 9, 12, 13, 18, 19, 20, 21, 22, and 23. In the construction of said tooth rail or beam, as shown in sectional drawings, Figs. 1, 2, and 9, two light-weight metal bars, A' A², are employed, having side bends formed in an oblique direction across their inner side surfaces. When said bars are thus prepared and placed side to side, openings D² are formed extending obliquely through between the inner vertical sides of said bars. The harrow-teeth are then inserted in said openings, and are supported by integral shoulders or stops D when standing either in a vertical or inclined position, (with respect to the direction in which the harrow is drawn,) as shown in solid and dotted lines. Said teeth may be held in their places by a bolt, pin, or rivet passing through both tooth and rail; or the bolt, pin, or rivet may pass only through the side of the rail, which clamps and holds the teeth between said bars by frictional contact.

Figs. 3, 4, and 10 show a slight variation in the distances between the tooth-supporting shoulders or stops D and the manner of holding the teeth in their places.

If preferred, the heads of the teeth may be bent at a right angle, with the bent-out end E' passing through a perforation, E², formed in the upper portion of one of the side bars shown at said figure, thus forming a pivot on which the tooth turns, the tooth-connecting pivot being located near the top edge of the rail or beam. The lower tooth-supports, D, are formed apart longitudinally with said rail or beam a distance proportionate to the angle at which the tooth is to be inclined.

The manner of attaching and holding the teeth in place between the bars A' A² may be further varied from what I have described.

At Fig. 14 the upper ends of the teeth are swaged or reduced on one or both of their sides, forming a neck, E⁴, with a short head, E⁵, which holds the tooth in place when clamped between the side bars; or, in lieu of said head E⁵, perforations E⁶ may be formed through their upper ends to receive a retaining-key at the top edge of the rail or beam A when said teeth are in place. In this instance the space between the top edges, B B, of the bars A' A² at each tooth-seat are formed in size to receive the neck E⁴ of the tooth when the side bars are placed together and held with suitable clamping bolts, pins, or rivets passing horizontally through the sides thereof, while the spaces between the bottom portion of said bars are made sufficiently wide to allow the tooth to move freely back and forth between its supporting shoulders or stops D, as shown at drawings, Figs. 5, 6, and 11.

Drawings Figs. 7, 8, and 12 show the tooth-seat. Openings D² may be formed extending through between said bars A' A², in size to fit the teeth, in which openings the harrow-teeth are clamped and supported in a rigid position.

The tooth-seats, with integral shoulders D, may be as practically formed alternately on each one of the bars A' A², as shown at Fig. 13.

Figs. 15, 16, and 17 represent an improved shaped metal bar in vertical cross-section, of which the tooth rails or beams may be formed either double or single. Said bar is formed with its two longitudinal edge portions or ribs set off projecting laterally over the inner or face side of the remaining central portion thereof a sufficient distance to bring the rear side of said laterally-set-off projecting edge ribs nearly or within line with the opposite or face side of the central portion of said bar, leaving small portions of metal connecting the rear inner edge corners of said edge ribs with the opposite or front edge corners of said central portion thereof. In the peculiar construction of said bar a much greater amount of lateral strength is secured without increasing the weight thereof over the weight of a bar having plain flat surfaces.

A' represents the central portion of said bar, and A³ the inner face side thereof.

B B are the two laterally-set-off edge ribs, forming two longitudinal rabbets, B², at the rear vertical side A⁴ of said edge ribs, and B' is a groove or channel on the inner face side, A³, of said central portion. A⁵ is the face side of the side projecting edge ribs B, and A⁶ are small portions of metal which unite the rear inner edge corners of the two edge ribs B with the front edge corners of the central part of said bar.

Should a greater amount of side strength or stiffness be required in the tooth rails or beams, the edge ribs B may be increased in thickness, as shown at A⁵, Fig. 17.

Fig. 16 shows the central part of said bar. If desired, it may be made lighter in weight by fluting its side longitudinally, forming two or more ribs, A⁷.

Drawings Figs. 18 to 23, inclusive, represent portions of the tooth rail or beam A as constructed with two of my improved shaped bars, showing slight variations in the manner of forming the integral tooth-supports D on their inner side surfaces. At drawings Figs. 18 and 19 the tooth seats and their supports are formed by stamping or pressing portions of the edge ribs B of the bars A' A² back, so as to stand in line with the central portion of their respective bars, as shown in dotted lines, also tooth-clamped in place between said bars, which are placed with their inner sides resting against each other, while at Figs. 20 to 23, inclusive, four separate tooth-supports are formed or raised from the edges B of each of the bars A' A², projecting inwardly on their face sides opposite each other, forming the tooth-seat openings D², extending through between said bars. In this instance said tooth-supports are formed apart upon the top and bottom edges of the rails or beams A, having space between them in proportion to the angle at which the tooth is to stand, but differing somewhat from Figs. 3 and 5 as to the special manner of forming said supports and the means of holding the teeth in their places, as will be observed at Figs. 22 and 23, which show said supports D formed or raised upon the inner top edge of the bars A' A², forming an opening between said supports in size to fit the tooth and allow a slight movement, while the lower tooth-supports may be formed with sufficient space between them longitudinally with said rail or beam as to allow the teeth to adjust themselves to stand at different angles. In this construction ordinary teeth may be used, which are clamped in their places between the top edges, B B, of the bars A' A² and held by frictional contact, said top edge supports serving as a pivot in which the tooth may turn, leaving their lower portions free to move between said bars, as shown at Figs. 21 and 22; or said tooth-supports D, as described, may be formed to project a sufficient distance upon the inner face side or edges of one of the double bars only to receive the tooth between said bars and allow the tooth to have a pivotal movement from one position to the other.

D³ are recesses which may be formed on the inner sides of one or both of the bars A' A². (Shown at Fig. 24.) When said bars are thus prepared and placed with their face sides resting against each other, openings D⁴ are formed vertically through between them, as shown at Fig. 13. A bolt is then passed through said openings and through suitable bars passing transversely across the top of three or more of the harrow rails or beams, (in the usual way,) clamping them together, whereby sections of various sizes may be formed.

Drawings Figs. 24 to 31, inclusive, represent a collection of dies adapted to the purpose of forming the integral tooth-supports D in the construction of the rails or beams, as shown and hereinbefore described, by rolling, stamping, or pressing. Said dies are made in two parts, H H', showing variation in the manner in which said supports may be formed.

At Fig. 24 both halves of the dies are made alike, having recesses H³ formed on their inner face sides. H⁴ is a fixed center-pin extending through between the bars A' A², said center-pin being made in size and shape the tooth-seats are to be formed. The metal bars, being placed on alternate sides of the center-pin, with each half of the dies resting on the outer sides of said bars, are then pressed inwardly, simultaneously bending each one of the bars together around the sides of said center-pin at a single stroke of said die, whereby the tooth-seat openings D² are accurately formed directly corresponding with each other, and extending in a vertical direction through between said bars.

If preferred, the tooth-seats may be formed on each one of the bars separately by using a two-part die, H H', constructed as shown at Fig. 25, with a metal bar placed between said dies ready for bending; and Fig. 26 shows the dies closed upon said bar, forming the tooth-seat on its lower side.

Fig. 28 represents the metal bar placed between the dies, which are adapted to forming the tooth-supports D projecting horizontally upon the edges of said bar; and Fig. 29 shows said dies closed, forming said supports, as shown at drawings Figs. 21, 22, and 23, by means of the projecting portions H² of the top part of the die H forcing portions of metal of the edges of said bars down into the corresponding recesses, H³, in the bottom part of said dies.

Fig. 27 is a sectional end view of said dies, showing the bar placed between the two parts thereof ready for bending.

Fig. 30 shows how the tooth-seats may be formed by passing the metal bars through between rolls H H', which are suitably geared with each other, the rim of the roll H' having cams H² the depth and length the tooth-seats are to be made; also corresponding recesses, H³, formed in the lower roll, H, to receive the lower bent-out portion of the bar as the tooth-seats are being formed.

The process of forming said tooth-seats and their supports D by rolling may be varied, as shown at Fig. 31, where the lower roll is dispensed with and a frame or bench, J, used in its stead, having a longitudinal moving carriage, I, which is provided with recesses H³ for each tooth-seat to be formed on the bar. Said carriage is suitably geared with the roll H', which travels over the metal bar as the carriage J moves beneath said roll, the cams H² bending the metal down into the recesses H³ until the end is reached. The carriage J then travels back for a new start on an additional bar to be rolled.

K K are small rollers to hold the bar A' down on the carriage while forming the tooth-seats.

Having described my invention, what I claim as new and useful, and desire to secure by Letters Patent, is—

1. In a harrow, the metal tooth-rails A, formed of double or duplicate bars A' A², arranged as described, having side bends forming tooth-seat openings D², extending through between the inner face sides of said bars, whereby integral shoulders or stops D are formed, having space between them longitudinally with said rail and adapted to support the teeth at different angles, in combination with the harrow-teeth inserted in said openings and pivotally attached in place by a bolt, pin, or rivet which passes through perforations formed through both said tooth and rail, substantially as specified.

2. The within-described harrow-tooth rail or beam formed of two longitudinal metal bars clamped side to side, having depressions stamped or pressed in the side surface of the edge portions thereof, forming integral tooth-supports on the inner side of said edge portions, and a harrow-tooth inserted between said bars and supported in position, substantially as described.

3. In a harrow the tooth-rails of which are formed of two metal bars arranged side by side, having integral tooth-supports formed by bending portions of the edges thereof projecting horizontally upon the inner face sides of one or both of said bars, and adapted to support the harrow-teeth at any desired angle, and means for holding said bars in position, substantially as described.

4. A metal harrow-tooth rail formed of longitudinal bars A' A², having corresponding depressions therein forming integral tooth-supports on their inner face sides, which limit the movement of the self-adjusting tooth to stand at different angles, in combination with a harrow-tooth inserted between said bars and attached thereto by a pivotal bolt, pin, or rivet which passes through perforations formed through both tooth and rail, substantially as described.

5. In a harrow, the metal bars A' A², forming the tooth-rails thereof, having corresponding depressions in their side surfaces forming tooth-seat openings extending obliquely through between the inner vertical sides of said bars, and lateral tooth-supporting shoulders formed integral therewith, having space between them longitudinally with the edges of said rail, allowing the teeth to automatically change their position and to stand either in a vertical or inclined position when the motion of the harrow is reversed to the opposite direction, and a pivotal bolt, pin, or rivet which passes horizontally through the side of both tooth and rail, substantially as described.

6. In a harrow, the combination of two longitudinal metal bars clamped side to side, forming the tooth-rails thereof, having a series of depressions in the side surface of one or both of said bars, forming the respective tooth-seat openings extending through between the inner vertical sides of said bars, whereby integral tooth-supports are formed having space between them longitudinally with said rail and adapted to support the self-adjusting teeth at different angles, and the harrow-teeth inserted in place and pivotally attached between said bars by bolts, pins, or rivets which pass through both teeth and rail, forming said pivots on which the teeth turn, substantially as described.

7. A harrow-frame the tooth-rails of which are formed of the peculiar-shaped metal bars shown in Figs. 15, 16, and 17, having its two longitudinal edge portions set off projecting laterally over one side of the central part thereof, forming a longitudinal groove or channel on its face side and rabbets B² in the outer corners of the opposite side thereof, substantially as described.

8. In a harrow the tooth-rails of which are formed of the peculiar-shaped metal bars, as described, having its two longitudinal edge portions B B projecting laterally over the inner face side, A³, of the central part thereof, so as to bring the rear vertical sides, A⁴, of said projecting edge portions and the opposite side of said central portion thereof near or within line with each other, substantially as described.

9. A metal tooth-bar for harrow-frames having a longitudinal groove or channel, B', formed between the two side projecting edges, B, and a rabbet, B², formed in each of its outer edge corners, substantially as and for the purpose specified.

10. In a harrow, the wrought-metal bar forming the tooth-rails thereof, having two or more longitudinal ribs, A⁷, on one side of the central part of said bar, and edge ribs B, formed integral with its two opposite edge corners, A⁶, said edge ribs forming rabbets B², substantially as described.

In testimony whereof I affix my signature in presence of two witnesses.

JAMES H. BARLEY.

Witnesses:
J. F. ANTES,
J. M. BYLER.